(No Model.) 6 Sheets—Sheet 1.
M. M. GILLAM.
ADVERTISING DEVICE AND ACTUATING MECHANISM THEREFOR.
No. 550,168. Patented Nov. 19, 1895.
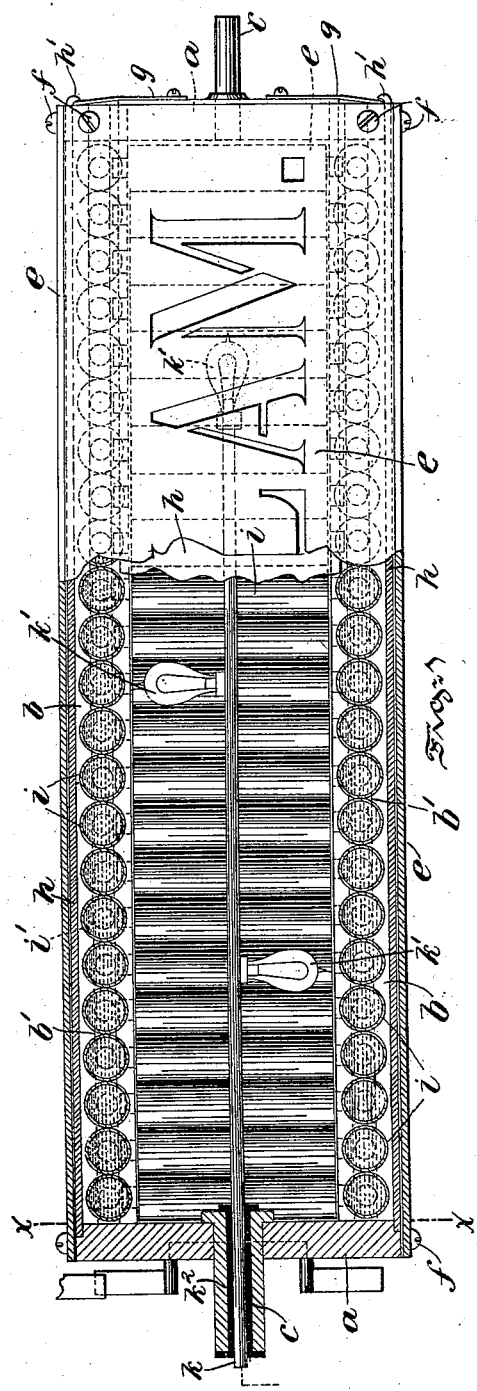
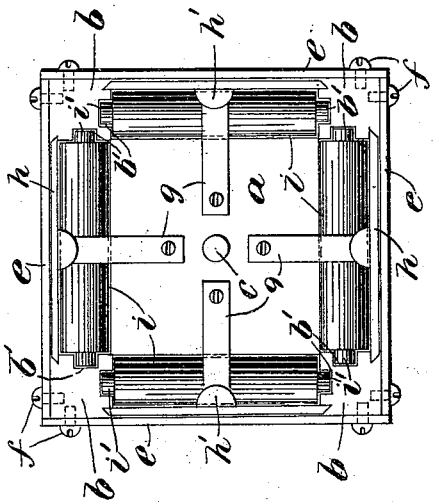
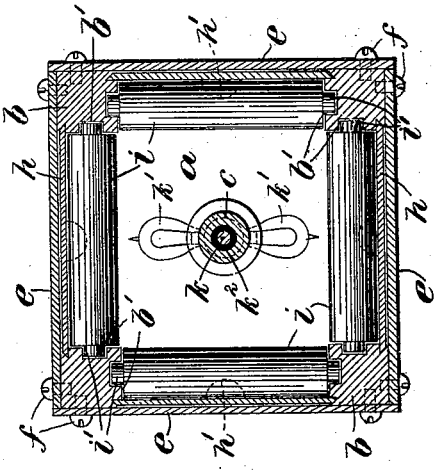
Witnesses:
Thomas M. Smith.
Louis Winterberger
Inventor.
Manly M. Gillam,
By J. Walter Douglass
Attorney.

(No Model.) 6 Sheets—Sheet 2.
M. M. GILLAM.
ADVERTISING DEVICE AND ACTUATING MECHANISM THEREFOR.
No. 550,168. Patented Nov. 19, 1895.
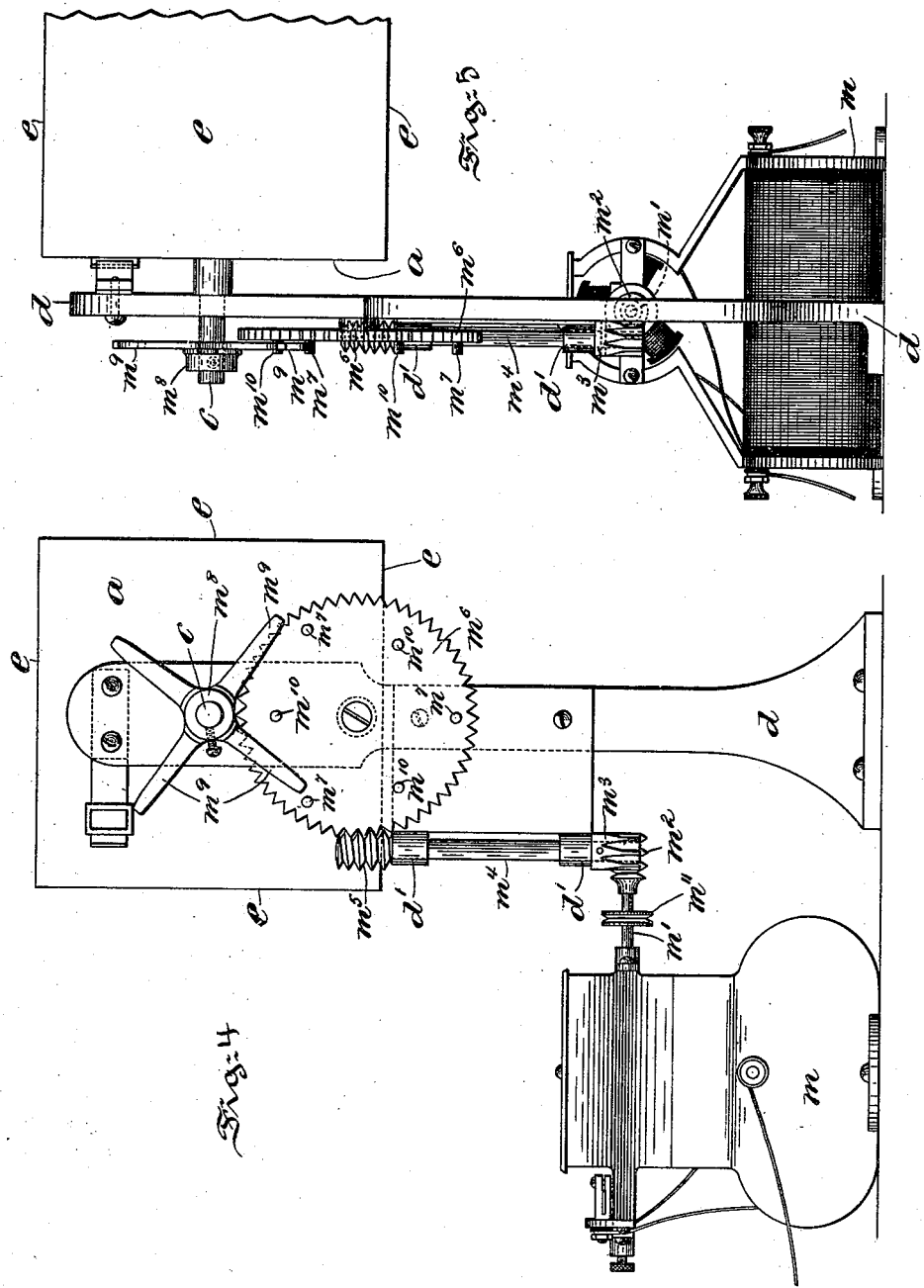

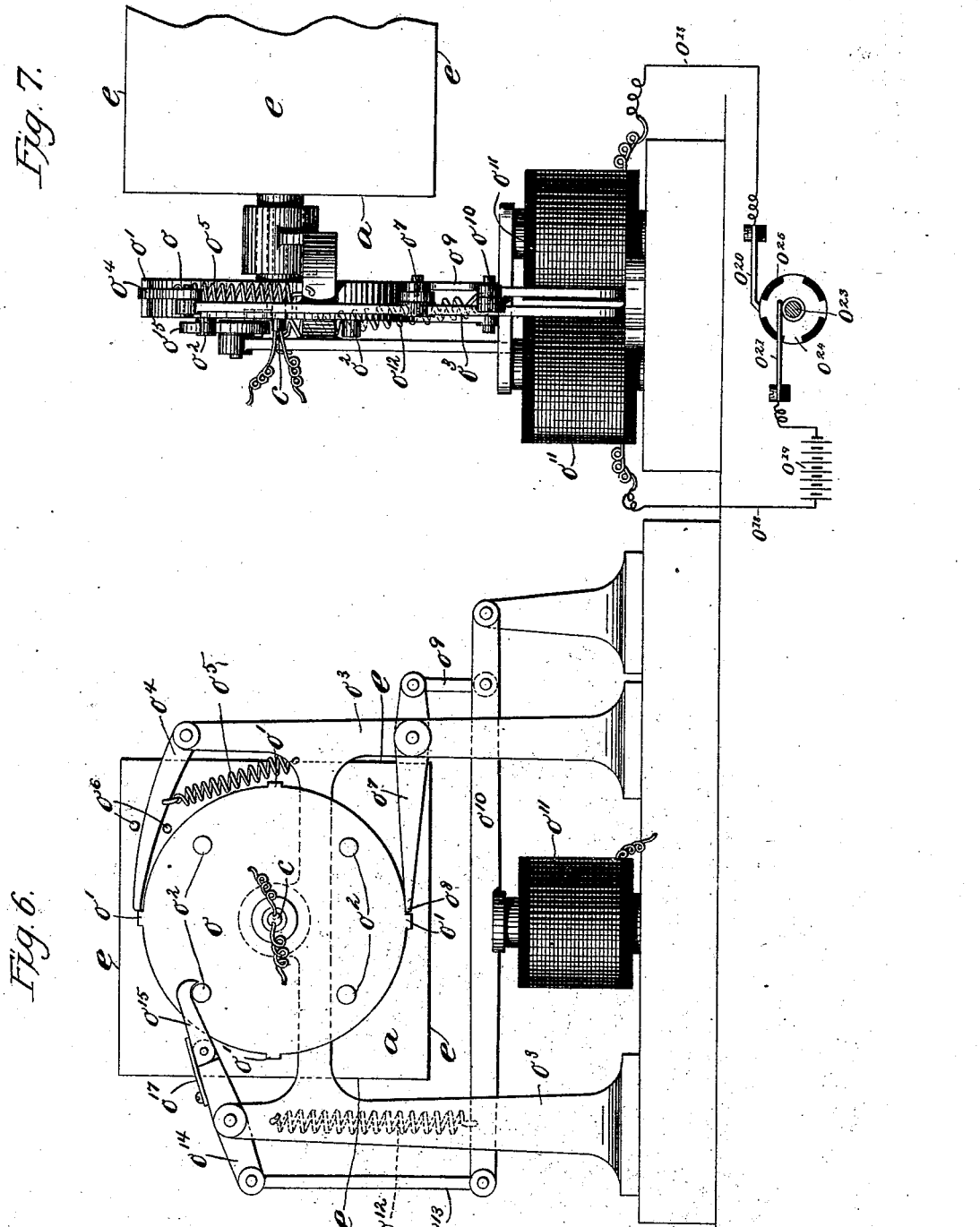

(No Model.) 6 Sheets—Sheet 4.
M. M. GILLAM.
ADVERTISING DEVICE AND ACTUATING MECHANISM THEREFOR.
No. 550,168. Patented Nov. 19, 1895.
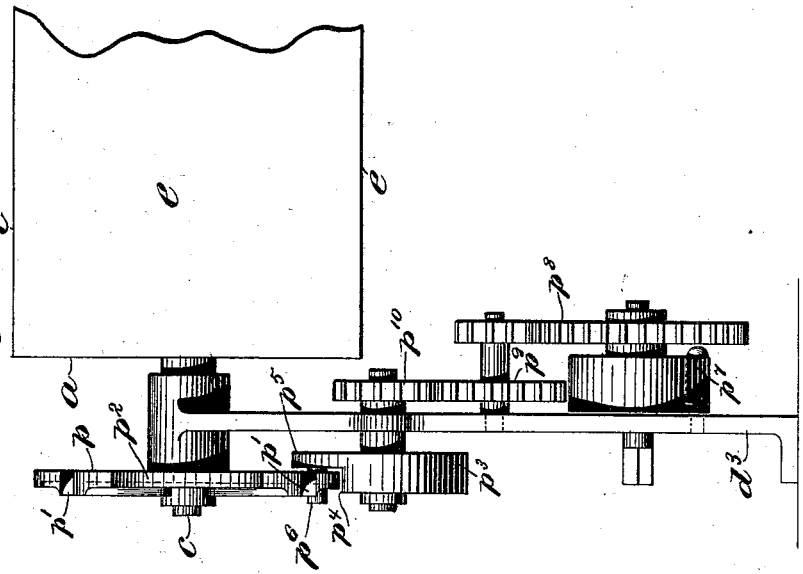
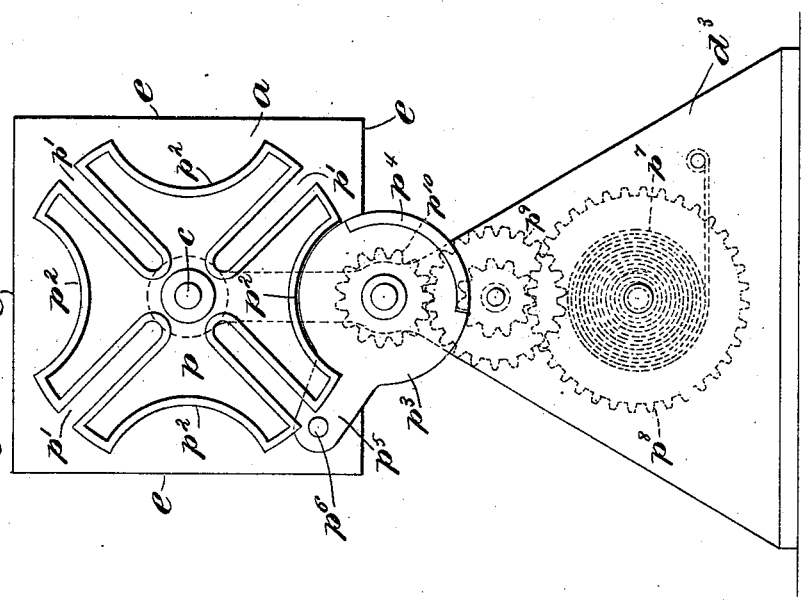
Witnesses:
Thomas M. Smith.
Louis Winterberger
Inventor:
Manly M. Gillam,
By J. Walter Douglass
Attorney.

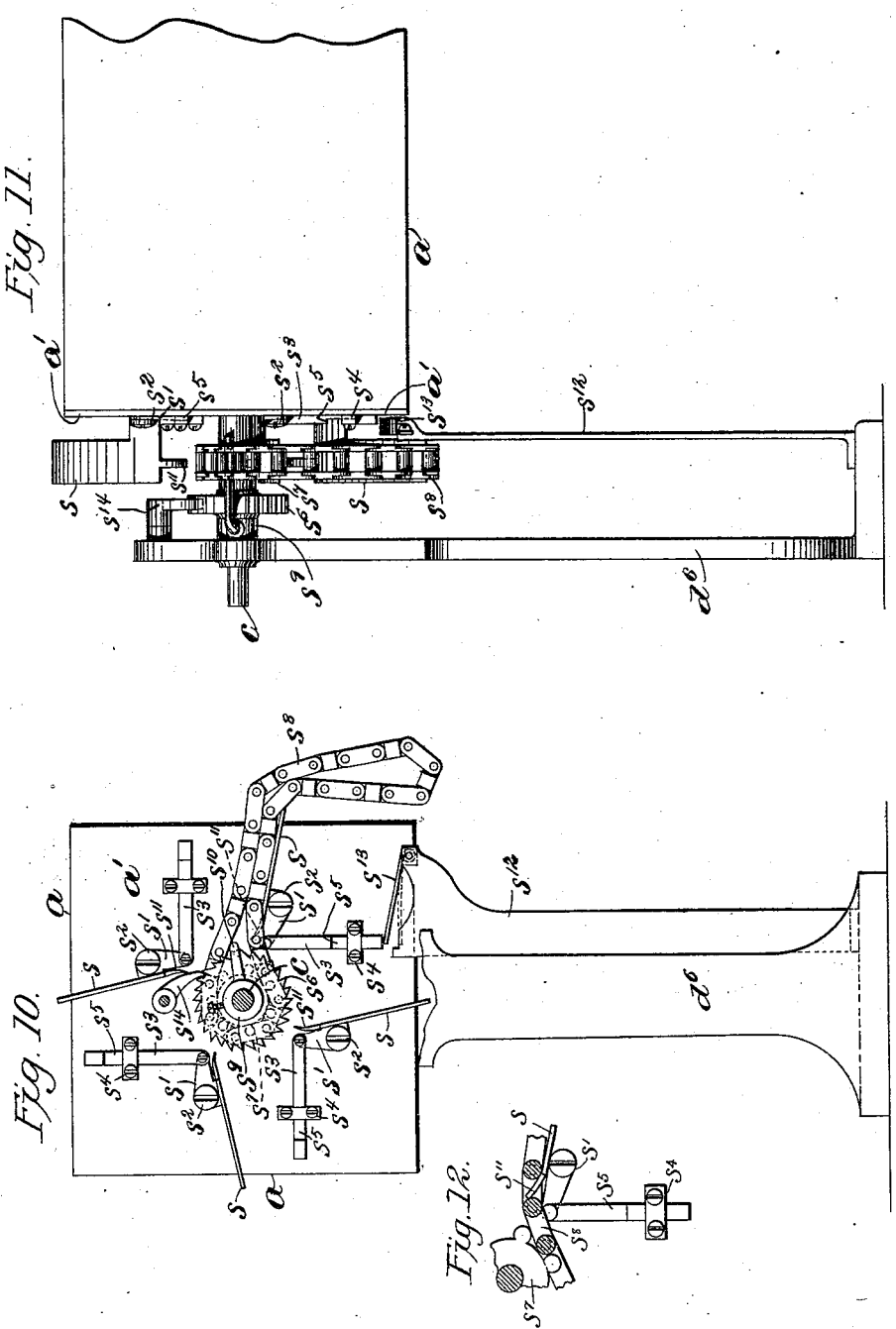

(No Model.) 6 Sheets—Sheet 6.
M. M. GILLAM.
ADVERTISING DEVICE AND ACTUATING MECHANISM THEREFOR.
No. 550,168. Patented Nov. 19, 1895.
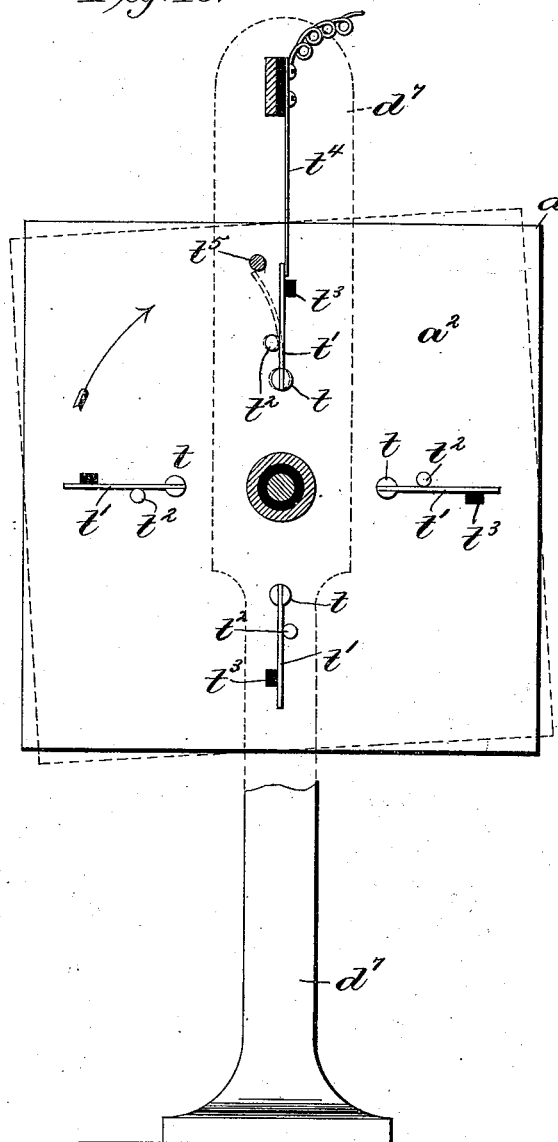
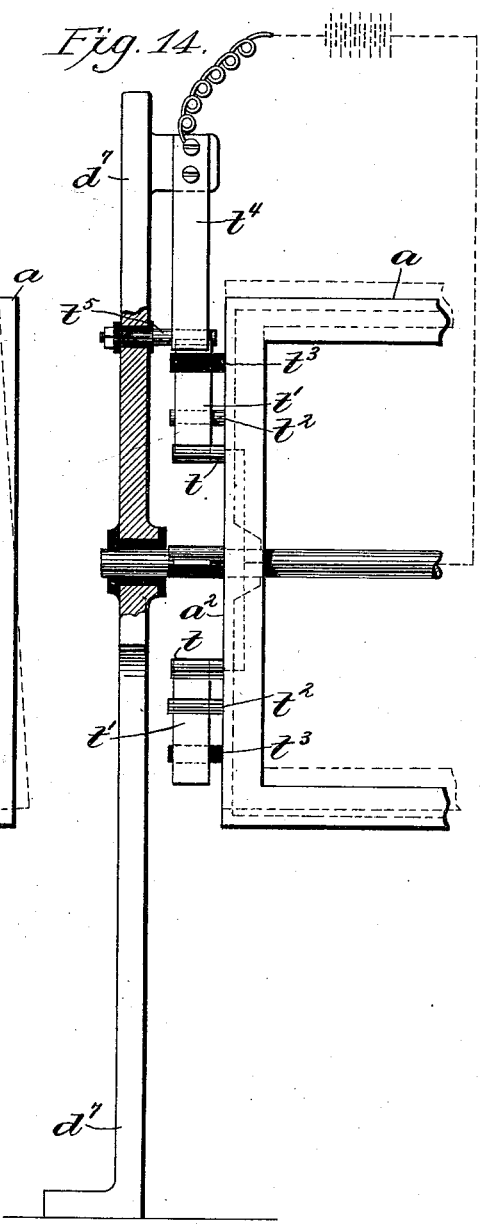

UNITED STATES PATENT OFFICE.

MANLY M. GILLAM, OF PHILADELPHIA, PENNSYLVANIA.

ADVERTISING DEVICE AND ACTUATING MECHANISM THEREFOR.

SPECIFICATION forming part of Letters Patent No. 550,168, dated November 19, 1895.

Application filed February 9, 1895. Serial No. 537,739. (No model.)

*To all whom it may concern:*

Be it known that I, MANLY M. GILLAM, a citizen of the United States, residing at the city of Philadelphia, in the county of Philadelphia and State of Pennsylvania, have invented certain new and useful Improvements in Advertising Devices and Actuating Mechanism Therefor, of which the following is a specification.

My invention has relation to advertising appliances, signs, or the like adapted to be periodically actuated and to be illuminated, and in which descriptive matter thereof may be changed, if desired, and in which the background for letters or other characters forming the descriptive matter of the appliance may be changed from translucent to opaque and from solid to variable color effects at will.

The principal objects of my invention are, first, to provide a simple, durable, and inexpensive construction of advertising appliance or sign, which is adapted at certain periods or moments of time to be actuated and illuminated, and, further, to attract attention by such periodic actuation and constant or periodic illumination and by variable or changeable color effects given to the letters or other characters of the appliance or sign; second, to provide a simple and inexpensive mode of rotating such an appliance, device, or sign periodically to present a fresh or new face to view; third, to provide an advertising appliance or sign adapted to be periodically rotated and a simple and inexpensive mode of constant or periodic illumination of the same by means of electricity; fourth, to provide in a sign adapted to be periodically rotated and illuminated a simple and inexpensive mechanism whereby the color effects or letters or other characters of the sign may be variegated or rendered changeable; fifth, to provide in a sign adapted to be periodically rotated a simple and inexpensive means for changing the letters or other characters from translucent to opaque, *ad libitum;* sixth, to provide in a sign adapted to be periodically rotated and to be illuminated means for simply and rapidly changing the descriptive faces of the sign, and, seventh, to provide a sign adapted to be periodically rotated and illuminated with descriptive faces susceptible of being removed and replaced by different descriptive faces, and the lettering or other characters of the faces adapted to be rendered either translucent or opaque, and the color effects of the lettering adapted to be changed at will.

My invention consists of the improvements in rotatable, illuminable, and changeable signs or the like and actuating mechanism therefor, constructed and arranged in substantially the manner hereinafter described, and claimed.

The nature and general features of my invention will be more fully understood from the following description, taken in connection with the accompanying drawings forming part hereof, in which—

Figure 1 is a side elevational view, partly in broken section, of a periodic rotatable sign embodying features of my invention, illustrating the sign-frame, the removable signplates, the translucent rods or tubes forming the variegated background for the letters of the sign, the slides forming the opaque variegated or solid background for the letters, the standard carrying the incandescent electric lamps, and the contacts connected therewith and rotating with the sign. Fig. 2 is a cross-sectional view taken on the line *x x* of Fig. 1, showing the interior of the sign, and also illustrating the mode of placing the tubes or rods and the slides in the frame. Fig. 3 is an elevational view of the right-hand end of Fig. 1, illustrating the means adapted to permit of the locking of the tubes or rods in the sign-frame. Fig. 4 is an end elevational view of a sign, the standard supporting the same, a four-armed bracket secured on the shaft of the sign, a toothed disk carrying pins adapted to strike against the bracket-arms to rotate the bracket and shaft of the sign, a worm-shaft engaging the toothed disk at one end and geared to the revolving shaft of an electromotor at the other end. Fig. 5 is a side elevational view of Fig. 4, illustrating means for permitting of the periodic rotation of the sign of the general character illustrated in Fig. 1. Figs. 6 and 7 are respectively end and side elevations of a still further modified form of apparatus for periodically rotating a sign, illustrating an electromagnet, and a lever carried by the armature of the magnet adapted to control the rotation of the sign. Figs. 8 and 9 are respectively end and side views of a still further modified form of apparatus for periodically rotating a sign in which the shaft of the sign is secured to a radially-grooved disk, the periphery of which is provided with concavities or slots, the grooved disk being driven by a disk and pinion, the periphery of the driving-disk being provided with a sector-flange fitting snugly the concavities or slot of the shaft-disk to prevent rotation thereof, the driving-disk also carrying an arm with a pin adapted to enter the grooves of the shaft-disk to rotate said disk, and the driving-disk geared through its pinion to suitable clockwork mechanism. Figs. 10 and 11 are respectively end and side views of a still further modified form of apparatus for periodically rotating a sign in which the frame of the sign is turned by a gravity-chain resting on suitable arms or shelves connected with the frame, the chain being carried by a sprocket which is rotated by a pinion loosely rotating on the sign-shaft. Fig. 12 is an enlarged transverse sectional view of a portion of the chain, illustrating the engagement of the arms with the links of said chain of Figs. 10 and 11; and Figs. 13 and 14 are respectively end and side views of means for making and breaking the circuit for the incandescent lamps in the interior of a sign of the character illustrated in Fig. 1 to periodically illuminate the same from the interior thereof.

With reference to the drawings it will be observed that in Figs. 1 to 3 one form of a sign has been illustrated with its component parts, and in Figs. 4 to 12, inclusive, mechanisms either mechanical or electrical for periodically actuating the sign, and in Figs. 13 and 14 connections and mechanism for illuminating the sign from the interior thereof.

A description will first be given of the construction of the sign proper with reference to Figs. 1 to 3. In these figures $a$ represents the end and $b$ the longitudinal frame-strips of the sign. From the ends $a$ project the shaft $c$, one or both of which is adapted to be periodically revolved by mechanism, to be hereinafter fully explained, to periodically rotate the frame of the sign. This frame, as illustrated, has four faces, in connection with which the descriptive matter is displayed; but it is to be understood that the sign may have a more or a less number of faces than above mentioned without departing from the spirit of my invention. On the end frames $a$, and extending over the longitudinal strips $b$, are secured sign-plates $e$, made preferably of metal, the letters or characters being stenciled therein. It is obvious that glass having the letters unpainted or "blocked out" upon an opaque background may also be employed. These plates $e$ may be removably secured to the end frames $a$ by screws $f$, or by pins, bolts, or other means. Below the sign-plates $e$, and extending through suitable slots in the end and side frames, are slides $h$, consisting of strips of colored pasteboard or similar opaque substances, such as wood and the like, covering completely the open or translucent portions of the sign. Either of the sides of these pasteboard slides may be placed behind the letters to form a background, and these sides may be wholly of one color—such as gold, bronze, red, &c.—or of variegated colors. Both surfaces may be colored alike or dissimilarly, *ad libitum*. The slides $h$, when in position, form an opaque background for the transparent or translucent lettering of the sign, and are generally employed when the sign is not to be illuminated. The said slides $h$ are provided at one end with the ear $h'$, by means of which they may be easily withdrawn from their slots. In the recesses $b'$ of the end strips $a$ and the longitudinal strips $b$ and extending at right angles thereto across and beneath the under surface of each sign-plate is provided a series of glass tubes $i$, containing colored liquids or pieces of broken colored glass. The tubes may also be replaced by solid glass rods differently or similarly colored, if desired. Each of the tubes $i$ may contain the same coloring or a separate coloring liquid differing from that of the other tubes in the series, or each tube may contain broken pieces of glass of one color or varying colors to suit the taste of the user or particular effects. When the slides $h$ are not in position, these colored tubes or rods form the background for the lettering of the sign-plates, and present to the observer a variegated translucent sign. When a light is placed back of these tubes or rods, as at night, the sign-letters will be luminous and colored either in solid or variegated colors. For daylight displays the slides $h$ are placed in position and the lettering has an opaque background of solid or variegated coloring-matter or color effects. These tubes or rods $i$ are provided at either end with a neck or projection $i'$, fitting the recess $b'$ of the frame. The rods or tubes $i$ may be rolled one by one in the recess of the frame until the frame is filled. These tubes or rods may be confined in the frame by the spring rods or clips $g$, as illustrated in Figs. 1 and 3, or in any other preferred manner. Within the sign is placed a bracket or standard $k$, carrying incandescent electric lamps $k'$. This bracket $k$ extends through a shaft $c$, which is hollow, and the bracket may be insulated from the shaft by a sleeve $k^2$ of insulating material, as clearly illustrated in Fig. 2 of the drawings.

A description will now be given of means for periodically actuating the sign through its shaft and the various modifications of apparatus for accomplishing said periodic actuation of the same.

In Figs. 4 and 5 is illustrated the simplest and therefore the preferred form of apparatus for periodically rotating the sign through its shaft $c$. In these figures $m$ represents an electromotor, the shaft $m'$ of which is provided with a worm $m^2$, meshing with a gear $m^3$ of a vertical shaft $m^4$, mounted in suitable bearings $d'$ of a support $d$ of the sign. The upper end of the shaft $m^4$ is provided with a worm $m^5$, meshing with the teeth of a pinion $m^6$, which has its bearing, also, in the support $d$ of the sign. On the face of the pinion $m^6$ are placed two sets of pins $m^7$ and $m^{10}$, arranged at suitable equal distances apart. On the shaft $c$ of the sign is keyed or otherwise secured a bracket $m^8$, provided with the arms $m^9$, corresponding to the number of faces $e$ of the sign. These arms $m^9$ project downward over the face of the pinion $m^6$ and in the path of the pins $m^7$ of the pinion $m^6$. The pins $m^7$ are both actuating and stop pins and strike and carry the arms $m^9$ when the pinion $m^6$ is rotated. The pins $m^{10}$ are auxiliary stop-pins and are placed between the actuating-pins $m^7$ and nearer the center of the pinion than the pins $m^7$, so that when the pinion $m^6$ is rotated the pins $m^{10}$ clear the ends of the arms $m^9$, but rest immediately back of the same when the sign has been turned to display the required face to an observer. In the mechanism illustrated in Figs. 4 and 5 the sign is provided with four faces and the bracket therefor is provided with four arms. The pinion $m^6$ is provided with three actuating-pins $m^7$, arranged at equal distances apart and near the periphery of the pinion $m^6$. The arms $m^9$ are at right angles to each other and the pins $m^7$ are separated by one-third the circumference of the pinion, or one hundred and twenty degrees. When the motor $m$ is energized, the shaft $m'$ and worm $m^2$ revolve, and thereby rotate the shaft $m^4$ through the vertical gear $m^3$. The worm $m^5$ of the rotating-shaft $m^4$ then rotates the pinion $m^6$, causing the actuating-pins $m^7$ to successively strike an arm $m^9$ of the bracket. Each pin after it strikes the arm of the bracket travels in contact with it until the arm has assumed a position at right angles to the position it occupied when first impinged upon by a pin, and consequently the said pin has also traveled ninety degrees. The pinion and its pin then travel thirty degrees, until the next pin reaches a striking position to operate the next arm of the bracket, and during the travel of the pinion thirty degrees, or one-sixth of its circumference, the arms $m^9$ are idle, thus permitting the sign to expose a face to the observer for a period of time corresponding to one-sixth of the time of the revolution of the pinion $m^6$. It will thus be observed that the sign, through its shaft $c$, bracket $m^8$, and arms $m^9$, is periodically rotated and periodically at rest. It is to be, however, understood that by varying the arrangement and number of the arms $m^9$ and pins $m^7$ the duration of motion and rest of the sign may be readily modified to suit all requirements. The pins $m^7$ and $m^{10}$ are successively stop-pins to prevent the back motion of the sign while it is at rest, and thereby serve to make the periods of rest sharp and defined. The shaft $m'$ and, through its worm-shaft and gear connections, the pinion $m^6$ may also be rotated by a belt passing over a suitable pulley $m^{11}$, and by connecting the same with a source of power. (Not shown.)

Referring to a still further modification of apparatus for periodically rotating a sign, as illustrated in Figs. 6 and 7, the sign-frame in this instance has secured at one of its ends a disk $o$, provided with projections or stops $o'$ on its periphery. These stops correspond in number with those of the descriptive faces of the sign, which in the present instance are four in number, as illustrated. The face of the disk $o$ is provided with projecting pins $o^2$, corresponding in number with those of the stops $o'$, and located midway between the same. To the standard $o^3$, in which the shaft and its disk have their bearing, is pivoted a pawl $o^4$, controlled in a downward position by a spring $o^5$, and having an up-and-down movement limited by the stop-pins $o^6$. This pawl $o^4$ lies in the path of the stops $o'$ and prevents, by abutting against the same, a backward movement of the disk $o$. Secured by pivotal connection to the standard $o^3$ and substantially parallel with the pawl $o^4$ is a lever $o^7$, at one end of which is a pawl $o^8$ to prevent a forward rotation of the disk $o$ by abutting against a stop $o'$ on the disk, which stop, by preference, is diametrically opposite the stop controlled by the pawl $o^4$. The other arm of the lever $o^7$ is pivotally connected by a link $o^9$ with an armature or electrically-controlled arm $o^{10}$. This arm $o^{10}$ is adapted to be depressed by an electromagnet $o^{11}$ against the resistance of a spring $o^{12}$, which raises the arm $o^{10}$ when not actuated electromagnetically. At the extreme end of the arm $o^{10}$ is pivotally secured a link $o^{13}$, pivoted to and controlling a lever $o^{14}$, which is pivoted in the standard $o^8$. The free end of this lever $o^{14}$ carries a spring-controlled striking-arm $o^{15}$, adapted to strike against one of the pins $o^2$ on the face of the disk $o$, and to thereby rotate the said disk. In operation to rotate the disk, and with it the shaft $c$ of the sign, the magnet $o^{11}$ is demagnetized and the arm $o^{10}$ is released thereby from electrical control and under the influence of the spring $o^{12}$ is elevated. The links $o^9$ and $o^{13}$ are raised, and at the same instant that the pawl $o^7$ is released from a stop $o'$ the hammer-arm $o^{15}$ of the lever $o^{10}$ strikes a pin $o^2$ and rotates the disk and shaft sufficiently to bring the next stop on the periphery in front of the pawl $o^4$, which it raises against the spring $o^5$. At the moment the said stop has passed the pawl $o^4$ the arm $o^{10}$ is electrically depressed, and through the link $o^9$ the pawl of the lever $o^7$ is thrown in the path of the stop on the periphery of the disk, and thereby stops the disk and shaft, and the link $o^{13}$ is lowered and draws the hammer-arm $o^{15}$ into striking position for the next pin $o^2$, the said pin $o^2$ depressing the arm $o^{15}$ against the force of its retractile spring $o^{17}$ sufficiently to pass beyond the end of the said arms, when the spring $o^{17}$ will bring the arm into striking position above the pin $o^2$. The disk and the shaft are thus periodically rotated, and in the arrangement illustrated in the drawings there are four separate stops before the disk has completed one revolution. By this arrangement the frame carried by the shaft presents its four sides successively to the spectator under periodic movements of the sign.

To control the circuit through the magnet $o^{11}$, one of the wires $o^{18}$ thereof is connected with a battery $o^{19}$ or other source of electric energy, and between the battery $o^{19}$ and the other wire $o^{18}$ of said magnet is interposed a circuit-breaking device consisting of an arm or contact $o^{20}$, resting on the periphery of a contact-breaking wheel $o^{22}$ and an arm $o^{21}$, resting upon the spindle $o^{23}$ thereof. The periphery of the wheel $o^{22}$ consists of alternate conducting and non-conducting surfaces $o^{24}$ and $o^{25}$, respectively, and, as in the instance shown, the sign $e$ has four faces to be successively presented. There are four conducting and four non-conducting surfaces on this wheel $o^{22}$. The wheel $o^{22}$ may be rotated through its spindle $o^{23}$ by clockwork (not shown) or by any suitable means.

In the modification, as illustrated in Figs. 8 and 9, the shaft $c$ is keyed to a disk $p$, having four radial grooves or slots $p'$ and the four concave faces $p^2$. Pivoted in the frame or standard $d^3$, supporting the shaft $c$ and directly below and under the disk $p$, is placed a disk $p^3$, carrying on a portion of its periphery an annular flange $p^4$, corresponding in length to the length of each of the concave faces $p^2$ of the disk $p$ and adapted to travel therein, as hereinafter more fully explained. The disk $p^3$ is provided with an arm $p^5$, carrying a pin $p^6$, which is adapted to engage a radial recess $p'$ of the disk $p$, and to thereby rotate the same. The disk $p^3$ and its arm $p^5$ are rotated by means of a clock-spring $p^7$ and gears $p^8$, $p^9$, and $p^{10}$. The arrangement of the two disks $p$ and $p^3$ and of the concave surfaces $p^2$, annular flange $p^4$, radial slot $p'$, and pin $p^6$ is such that when the said pin $p^6$ enters the slot $p'$ the flange $p^4$ has cleared the concavity or slot $p^2$. The advancement of the pin by the rotation of the disk $p^3$ throws the disk $p$ a quarter-revolution by the impingement of the said pin with the walls of the slot $p'$. As this pin begins to leave the slot $p'$ after the disk $p$ has been thrown, the flange $p^4$ begins to enter the concavity or slot $p^2$ and thereby stops any forward movement of the disk $p$ due to its momentum. The disk $p$ then remains at rest, while the arm and pin travel with the disk $p^3$ until the pin strikes the next succeeding groove. While the pin is traversing the flange $p^4$ is also revolving in the concave face $p^2$ of the flange $p^4$ of the disk, and when the pin reaches the groove $p'$ the flange has cleared the concavity, substantially in the manner indicated in Fig. 8 of the drawings. The arrangement of the two disks $p$ and $p^3$, the concave face $p^2$, and the flange $p^4$ and arm and pin $p^6$ is such that, as shown in the drawings, the arm and pin must travel in an arc of one-third of the entire circumference of the disk $p^3$ of one hundred and twenty degrees, while the disk $p$ moves a quarter-revolution or ninety degrees and the disk $p$ is at rest, while the arm $p^5$ is traveling the remaining two-thirds of the circumference of the pitch-circle of the disk $p^3$. It will be obvious by calculation that the distance traveled by the pin in its engagement with the disk $p$ may be varied to vary the respective action and idle movement of the said pin and the corresponding period of rotation and rest of the disk $p$ and the shaft $c$. In the same way the respective times or movements of revolution and rest of the disk $p$ may be varied by accelerating or retarding the speed of the revolving disk $p^3$.

In Figs. 10, 11, and 12 I have illustrated a still further modified form of actuating mechanism for a sign in which the shaft $c$ and the sign $a$ are rotated periodically by means of a gravity-chain mechanism. In these figures the end of the plate $a'$ of a sign $a$ is provided with four flat arms $s$, each of which are integral with or secured to one arm of a bell-crank lever $s'$, pivoted, as at $s^2$, in the plate $a'$. The other arm of the lever $s'$ is pivoted to the slide $s^3$, guided in the bar $s^4$, to which it is recessed, as at $s^5$. Loosely secured on the shaft $c$ of the sign and rotating thereon is a ratchet-wheel $s^6$, integral with a sprocket-wheel $s^7$, on which is carried an endless sprocket-chain $s^8$. The ratchet-wheel $s^6$ and its sprocket-wheel $s^7$ are continuously rotated by suitable clockwork or electromagnetic appliances. (Not shown.) Keyed to the shaft $c$ of the sign and rotating therewith is a collar $s^9$, carrying a depending pin $s^{10}$, extending within the chain $s^8$, and adapted to carry the same when the shaft $c$ is rotated, as hereinafter more fully explained. The arms $s$ are provided at one end with a prong $s^{11}$, adapted when the slide $s^3$ is raised to engage in the links of the chain $s^8$, as shown in Fig. 12. On a suitable bracket $s^{12}$ of the standard $d^6$ of the sign $a$ is placed the flat spring $s^{13}$, adapted as the sign is rotated to rest under successive slides $s^3$ to raise the same and to thereby throw the prong $s^{11}$ of the supporting-arm $s$ into engagement with a link of the chain $s^8$. The pinion $s^6$ is free to rotate in one direction only, a pawl $s^{14}$ preventing its rotation in the other direction substantially in the manner illustrated in Fig. 10 of the drawings. When the pinion $s^6$ rotates, the sprocket $s^7$ carries the chain from a vertical position with respect to the sign and it accumulates upon an arm $s$ with the prong end $s^{11}$ in engagement with one of the links of the chain $s^8$. When this chain $s^8$ has been entirely fed onto the support and hangs down therefrom substantially in the manner indicated in Fig. 10, that side of the sign is overweighted and the sign will be rotated until the chain is in a vertical position, the pin $s^{10}$ rotating with the shaft carrying the chain $s^7$ into engagement with the prong $s^{11}$ of the next succeeding support or arm $s$.

The sign $a$, periodically or intermittently rotated by any of the mechanisms, as hereinbefore fully described, may likewise be periodically or intermittently or constantly illuminated by incandescent electric lamps $k'$, as already explained, the current energizing said lamps being cut off during the revolution of the sign and the circuit established while the sign is at rest in a momentary fixed position. These lights or lamps $k'$ by preference are attached to a hollow standard or bracket $k$, substantially as illustrated in Figs. 1, 2, and 3 of the drawings.

In Figs. 13 and 14 a mode whereby the circuit of the lamps is established or broken by the periodic revolution of the sign $a$ is illustrated. In these figures the end plate $a^2$ of the sign carries a series of contact-pins $t$, placed in circuit with the wires of the electric lights or lamps $k'$. Each of these pins is provided with a contact-strip $t'$ of spring metal or other preferred material. At the back of the strip $t'$, with respect to the forward motion of the sign $a$, is provided a pin $t^2$, and in front of the pin is provided a plug or block $t^3$ of insulating or non-conducting material. The contact-strip $t'$ is thus held between the pin $t^2$ and the block $t^3$, substantially at right angles to the sides of the sign. On the standard $d^7$ of the sign $a$ is provided another contact-strip $t^4$, interposed in the circuit of the lamps and adapted when in contact with the strip $t'$ to close the circuit and when separated from the said strip to break the circuit. The strip $t'$ is adapted to rest upon the strip $t^4$ when the rotation of the sign ceases. To prevent sparking a pin $t^5$ is secured to the standard $d^7$ back of the contact-strip $t^4$ and directly in the path of the spring contact-strip $t'$. As the strips approach each other, the strip $t'$ will strike against the pin $t^5$ and be bent backward, substantially as indicated in dotted lines in Fig. 13 of the drawings. As the sign further rotates, the strip $t'$ will clear the pin $t^5$ and spring forward until it contacts with the strip $t^4$, and its forward motion being stopped by the plug or stop $t^3$. An almost instantaneous contact is thus established, preventing in a great measure sparking between the said contacts. The contact-strip $t^4$ being also of spring metal of greater resiliency than the strip $t'$ the contacts will gradually separate, when the sign $a$ is again rotated, the strip $t^4$ being bent forward until the edges of the strips have cleared each other, when the said strip will spring back to its initial position.

From the foregoing description it will thus be seen that my invention consists, broadly, of a periodic rotatable and illuminable sign or analogous appliance provided with descriptive faces which are changeable and variable as to color effects and translucent or opaque, and hence I do not wish to be understood as confining myself to any specific mechanism for periodically rotating a sign or of illuminating constantly, intermittently, or periodically the same, as any of the several devices or mechanisms illustrated and hereinbefore described, or equivalent means thereof, may be employed and accomplish like results and desired effects and still be within the scope of my invention.

Having thus described the nature and objects of my invention, what I claim as new, and desire to secure by Letters Patent, is—

1. An advertising appliance, comprising a frame provided with descriptive faces, mechanism for periodically actuating said appliance, means for controlling said mechanism and means for illuminating periodically said descriptive faces provided with contact strips in an electric circuit, one of said strips being fixed while the others are movable with the frame and independently movable therefrom, said movable contact strips being limited in their independent movement by said frame, substantially as and for the purposes set forth.

2. An advertising appliance, comprising a sign adapted to be periodically actuated and having a plate provided with a translucent back-ground for night display, a periodic source of electric illumination located behind said back-ground and controlled by contact strips in a circuit, one fixed and the others movable with the appliance a predetermined distance, and independently movable with respect to said appliance a distance limited by the same, substantially as set forth.

3. An advertising appliance, comprising a frame provided with descriptive faces, mechanism to periodically actuate said appliance, means to control said mechanism, means to periodically illuminate from the interior the descriptive faces of the appliance and a circuit device in a circuit provided with contact pins, strips and an insulating plug, one of said strips fixed and the others movable with and independently from the appliance and limited in their independent movement by said pins and plug, substantially as and for the purposes set forth.

4. An advertising appliance, comprising a frame provided with removable descriptive faces, means for varying the background of said faces, means for changing the background to either translucent or opaque, mechanism for periodically rotating the appliance, means for controlling said mechanism, means for periodically illuminating from the interior the descriptive faces of the appliance, and means consisting of contact strips in a circuit, one fixed and the others limited as to their ranges of movement by pins and insulating plugs connected with the movable frame, substantially as and for the purposes set forth.

5. An advertising appliance, comprising a frame provided with removable descriptive plates or sign faces, means for changing the color of the background of the descriptive faces from opaque to translucent, a shaft carrying said frame, means consisting of a rotatable shaft having a worm, a shaft having a gear meshing at its lower end with the worm of said rotatable shaft, a worm carried by a vertical shaft, a disk geared to the worm of said shaft and actuating pins provided on the face of said disk, and a bracket keyed to said frame-shaft with depending arms adapted to periodically strike said pins, substantially as and for the purposes set forth.

6. An advertising appliance adapted to be rotated and provided with a hollow rotating shaft carrying a series of electric lights and circuit connections, contacts established with said connections and rotating with and independently movable from the appliance, stationary contacts in circuit and in the path of the rotating contacts adapted to make and break the circuit with said rotating contacts to illuminate periodically said lamps, and means rotating with the appliance to control the independent movement of said contacts, substantially as and for the purposes set forth.

7. An advertising appliance adapted to be periodically rotated and provided with means consisting of a hollow standard, electric lamps secured thereto, contact pins carried by and in circuit with the lamps, contact strips connected with said pins to establish a circuit with said lamps, said strips rotating with and independently movable from the appliance, and stationary contacts located in the path of the rotating contact strips and adapted to contact with said strips to illuminate periodically or intermittently from the interior the appliance, and means rotating with the appliance to control the independent movement of the rotating contact strips to prevent sparking, substantially as and for the purposes set forth.

In testimony whereof I have hereunto set my signature in the presence of two subscribing witnesses.

MANLY M. GILLAM.

Witnesses:
THOMAS M. SMITH,
RICHARD C. MAXWELL.